United States Patent
Ito et al.

(10) Patent No.: US 9,337,936 B2
(45) Date of Patent: May 10, 2016

(54) OPTICAL TRANSMISSION APPARATUS, OPTICAL TRANSMISSION METHOD AND PROGRAM FOR OPTICAL TRANSMISSION

(71) Applicant: NEC Corporation, Minato-ku, Tokyo (JP)

(72) Inventors: Kumi Ito, Tokyo (JP); Kouichi Suzuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 36 days.

(21) Appl. No.: 14/210,833

(22) Filed: Mar. 14, 2014

(65) Prior Publication Data

US 2014/0294402 A1   Oct. 2, 2014

(30) Foreign Application Priority Data

Mar. 28, 2013   (JP) ................................. 2013-068585

(51) Int. Cl.
| | |
|---|---|
| *H04B 10/04* | (2006.01) |
| *H04B 10/556* | (2013.01) |
| *H04B 10/50* | (2013.01) |
| *H04B 10/548* | (2013.01) |
| *H04B 10/516* | (2013.01) |

(52) U.S. Cl.
CPC ........ *H04B 10/5561* (2013.01); *H04B 10/5053* (2013.01); *H04B 10/5055* (2013.01); *H04B 10/5161* (2013.01); *H04B 10/548* (2013.01)

(58) Field of Classification Search
None
See application file for complete search history.

(56) References Cited

U.S. PATENT DOCUMENTS

| | | | | |
|---|---|---|---|---|
| 8,879,873 | B2* | 11/2014 | Goh ................... | H04B 10/5161 385/3 |
| 2004/0208647 | A1* | 10/2004 | Gill et al. ....................... | 398/188 |
| 2005/0007642 | A1* | 1/2005 | McGhan ................. | G02F 1/225 359/237 |
| 2008/0232820 | A1* | 9/2008 | Burchfiel ............. | H04B 10/505 398/183 |
| 2009/0136241 | A1* | 5/2009 | Mo et al. ........................ | 398/188 |
| 2009/0196602 | A1* | 8/2009 | Saunders ........... | H04B 10/5053 398/26 |
| 2010/0239264 | A1* | 9/2010 | Yang .................... | H04B 10/505 398/98 |
| 2010/0254715 | A1* | 10/2010 | Yamashita ....... | H04B 10/50572 398/188 |
| 2014/0082675 | A1* | 3/2014 | Kim .................... | H04L 27/2601 725/64 |
| 2015/0104194 | A1* | 4/2015 | D'Errico ....................... | 398/188 |

FOREIGN PATENT DOCUMENTS

| | | |
|---|---|---|
| JP | 2012-19406 A | 1/2012 |
| WO | 2010/035662 A1 | 4/2010 |

OTHER PUBLICATIONS

Poole, Ian, Newnes Guide to: Radio and Communications Technology, 2003, Elsevier Ltd., p. 64.*

(Continued)

*Primary Examiner* — Ken Vanderpuye
*Assistant Examiner* — Jai Lee

(57) ABSTRACT

An object of the invention is to provide an optical transmission apparatus capable of reducing the influence of nonlinear effect of an optical fiber, suppressing a band requested to a device from being widened, easily bias controlling a modulator, and flexibly switching plural modulation methods.
An optical transmission apparatus 301 according to the invention includes a modulator 101 and a controller 102. The modulator 101 is a modulator capable of quadrapture phase-shift keying the light from a light source and outputting the light. The controller 102 controls the input signal to the modulator 101 and causes the modulator 101 to carry out a quadrapture phase-shift keying operation or a π/2 shift binary phase-shift keying operation.

6 Claims, 11 Drawing Sheets

(56) References Cited

OTHER PUBLICATIONS

Poole, Ian., Newnes Guide to Radio and Communicaitons Technology, 2003, Elsevier Ltd., p. 64.*

Eiichi Yamada et al., "Compact and Power Saving Optical Modulator", NTT Technology Journal, Jan. 2005, pp. 19-22 with Partial English Translation. See cited Non Patent Liteature 1 on p. 6, [0019] of translated Applicant's Specification for explanation of relevance.

* cited by examiner

PRIOR ART

PRIOR ART (a)
BPSK
MODULATION DATA TRAIN (b)
π/2 SHIFT BPSK
MODULATION DATA TRAIN (a)
DBPSK
MODULATION DATA TRAIN (b)
π/2 SHIFT DBPSK
MODULATION DATA TRAIN

US 9,337,936 B2

OPTICAL TRANSMISSION APPARATUS, OPTICAL TRANSMISSION METHOD AND PROGRAM FOR OPTICAL TRANSMISSION

INCORPORATION BY REFERENCE

This application is based upon and claims the benefit of priority from Japanese patent application No. 2013-068585, filed on Mar. 28, 2013, the disclosure of which is incorporated herein in its entirety by reference.

BACKGROUND OF THE INVENTION

1. Field of the Invention

The invention relates to an optical transmission apparatus, an optical transmission method, and an optical transmission program for phase modulating continuous light using an external modulator.

2. Description of the Related Art

An optical fiber communication has a first request for increasing the speed of a bit rate per one wavelength to carry out a large capacity communication. However, since an optical fiber has dispersion characteristics, a transmission distance is restricted in proportion to the square of a symbol rate. Thus, Patent Literature 1, for example, introduces a transmission method of reducing the symbol rate by a polarization separation method using DP-DPSK (Dual-Polarization Differential Phase-Shift Keying). The reduction of the symbol rate contributes also to the constriction of an occupied band and further contributes to an increase of the overall transmission capacity in a wavelength division multiplex transmission.

Note that DPSK of Patent Literature 1 means differential binary phase-shift keying (differential BPSK: Differential Binary Phase-Shift Keying). The BPSK is a method of modulating the phase of light to bit "0" and "π" according to the bit of a modulation signal "0" and "1", and DPSK is a method of modulating the phase of light by the difference between the bit of a modulation signal and the bit of a modulation signal just before the above modulation signal. For example, when a bit changes, the phase of light is set to +π, whereas when a bit does not change (the same codes continue), the phase of light is set to −π.

To prevent interference at the time of reception, DP-DPSK modulation requires a first method of employing polarization tracking, a second method of generating signal light using plural light sources, and a third method of giving offset to the carrier frequencies of two orthogonal polarization waves. However, the first method has a problem that it is difficult to perfectly remove interference. The second method has a problem that it is difficult to manage the plural light sources. The third method has a problem that it is weak to the intercode interference due to band restriction and the like.

In Patent Literature 1, to solve the problem of the DP-DPSK modulation, the light from the same light source is polarization-separated, one of the lights is DPSK modulated, and the other light is zero chirp π/2 shift DPSK modulated, thereby the lights are polarization multiplexed. The zero chirp π/2 shift DPSK modulation of Patent Literature 1 is DPSK modulation in which a signal point on In-phase channel (I-ch) and a signal point on Quadrature phase channel (Q-ch) are alternately set every one symbol.

In contrast, the optical fiber communication has plural modulation methods, and each of them has an advantage.

FIG. 1 is a block diagram explaining a transmitter 51 for carrying out the DPSK modulation introduced in Patent Literature 2. The transmitter 51 is configured to include a precoder 201, a driver 211, and a LN (LN: Lithium Niobate) modulator 401.

The precoder 201 receives an electric signal to be transmitted, encodes the signal so that it satisfies the standard of an optical signal to be output, and generates a modulation signal. The driver 211 amplifies the modulation signal that is output by the precoder 201 to a voltage necessary to modulation. The LN modulator 401 outputs modulated light by shifting the phase of the optical carrier wave that is output from a laser diode 215 to 0 or π according to the modulation signal output from the driver 211. A constellation map 225 shown in FIG. 1 shows the phase of an ordinary DPSK signal (a transmission signal output from a DPSK optical transmission apparatus). As shown in the constellation map 225, the phase of the DPSK signal is set to 0 or π every symbol. Note that the same operation is carried out also in BPSK modulation (Binary Phase Shift Keying), the difference is only a modulation signal.

FIG. 2 is a block diagram explaining a transmitter 52 for carrying out DQPSK modulation (Differential Quadrature Phase-Shift Keying) introduced in Patent Literature 2. The transmitter 52 is configured to include a precoder 204, drivers (421, 422), and a LN modulator 410.

The LN modulator 410 includes a first arm 431, a second arm 432, a first Mach-Zehnder type modulator 411, a second Mach-Zehnder type modulator 412, and a phase shift section 413. The first Mach-Zehnder type modulator 411 is provided to the first arm 431, and the second Mach-Zehnder type modulator 412 is provided to the second arm 432. The phase shift section 413 is provided behind the Mach-Zehnder type modulator 412 of the second arm 432.

The precoder 204 receives an electric signal to be transmitted and encodes the signal so that it satisfies the standard of an optical signal to be output, and generates an I phase side modulation signal and a Q phase side modulation signal. The drivers (421, 422) amplify the I phase side modulation signal and the Q phase side modulation signal output by the precoder 204 up to a voltage necessary to modulation, respectively and output the signals to the first Mach-Zehnder type modulator 411 and the second Mach-Zehnder type modulator 412 as modulation signals.

The LN modulator 410 branches the optical carrier wave output from the laser diode 215 and outputs the branched optical carrier waves to the first arm 431 and the second arm 432.

The first Mach-Zehnder type modulator 411 provided with the first arm 431 and the second Mach-Zehnder type modulator 412 provided with the second arm 432 output modulation light by shifting the phase of the optical carrier wave to 0 or π according to the I phase side modulation signal and the Q phase side modulation signal, respectively.

Further, in the second arm 432, the phase shift amount of the optical signal by the phase shift section 413 is set to π/2 according to the value of a bias α. Thus, after the phase of the optical signal output from the second Mach-Zehnder type modulator 412 has been shifted π/2, the optical signal is synthesized (multiplexed) with the optical signal output from the first arm 431.

In FIG. 2, 415 shows the constellation of the optical signal output from the first arm 431, and 416 of FIG. 2 shows the constellation of the optical signal output from the second arm 432. Further, 226 of FIG. 2 shows the constellation of the optical signal with a quadrapture phase that is obtained by synthesizing the optical signal output from the first arm 431 with the optical signal output from the second arm 432. Note that the same operation is carried out also in QPSK modulation (Quadrature Phase-Shift Keying), the difference is only a modulation signal.

The optical fiber communication has also a second request that plural modulation methods can be flexibly switched by a single system in consideration of versatility. However, constructing an optical fiber communication system to each of the modulation methods to allow plural modulation signals to be transmitted inevitably increases cost.

Thus, Patent Literature 2 explains a system capable of flexibly switching two modulation methods of DPSK and DQPSK by a single optical fiber communication system. In Patent Literature 2, a single QPSK modulator is used and the two modulation methods of DPSK and DQPSK are switched by bias controlling the modulator.

CITATION LIST

Patent Literature

Patent Literature 1: JP 2012-019406 A
Patent Literature 2: WO 2010/035662 A

Non Patent Literature

Non Patent Literature 1: NTT technology Journal 2005, Vol. 17, No. 1, "Compact and Power Saving Optical Modulator" Summary of Invention

SUMMARY OF THE INVENTION

As to the first request, as a factor for degrading the receiving sensitivity of an optical fiber communication and restricting a transmission distance, there is also a nonlinear effect in addition to the dispersion characteristics. The nonlinear effect is a phenomenon that the refractive index of an optical fiber changes according to optical intensity, and the phenomenon includes self phase modulation (SPM), in which a phase is shifted by self optical intensity, and cross phase modulation (XPM) in which a phase is shifted by the optical intensity of other light. A variation of the intensity of an optical signal to be transmitted increases the influence of the nonlinear effect.

Here, Patent Literature 1 relates to DPSK modulation, and an extinction state occurs on the way of phase transition, and the optical intensity greatly varies. Thus, the influence of the nonlinear effect is strong, which causes a problem that a transmission distance is restricted by the nonlinear effect.

Further, ordinarily, a band requested to a device such as a modulator is widened in proportion to an increase of a bit rate (symbol rate). When an increase of a bit rate is requested to increase the capacity of an optical fiber communication, it is necessary to increase the symbol rate in response to the request. Since this means to widen the band requested to the device, Patent Literature 1 has also a problem that the realization thereof becomes more as well as an increase of cost.

Further, as to the second request, although the system of Patent Literature 2 can cope with the two modulation methods of DPSK and DQPSK by the single modulator and can reduce the cost, Patent Literature 2 cannot solve the problem of Patent Literature 1 that the transmission distance is restricted by the nonlinear effect at the time of DPSK modulation.

To solve the problems, an object of the invention is to provide an optical transmission apparatus, an optical transmission method, and an optical transmission program capable of reducing the influence of a nonlinear effect of an optical fiber, suppressing a band requested to a device from being widened, easily controlling bias of a modulator, and flexibly switching plural modulation methods.

Solution to Problem

In order to solve the object, there is provided an optical transmission apparatus according to an exemplary aspect of the invention including: a modulator which can modulate the light from a light source by quadrapture phase-shift keying and can output the modulated light; and a controller which controls an input signal to the modulator makes the modulator operate a quadrapture phase-shift keying modulation or a $\pi/2$ shift binary phase-shift keying modulation.

In order to solve the object, there is provided an optical transmission method according to an exemplary aspect of the invention including: a switching instruction receiving procedure for receiving an instruction for switching the modulation operations of a modulator which is able to modulate of the light from the light source by quadrapture phase-shift keying and can output the modulated light; and a switch completion procedure for controlling the input signal to the modulator after the switching instruction receiving procedure and makes the modulator operate the quadrapture phase-shift keying modulation or the $\pi/2$ shift binary phase-shift keying modulation.

In order to solve the object, there is provided an optical transmission program according to an exemplary aspect of the invention for realizing; a function for a controller which controls the inputting signal to the modulator which modulates the light from a light source by the quadrapture phase-shift keying modulation; and a function make the modulator operate a quadrapture phase-shift keying modulation or a $\pi/2$ shift binary phase-shift keying modulation.

DETAILED DESCRIPTION OF EXEMPLARY EMBODIMENTS

Figure 1:
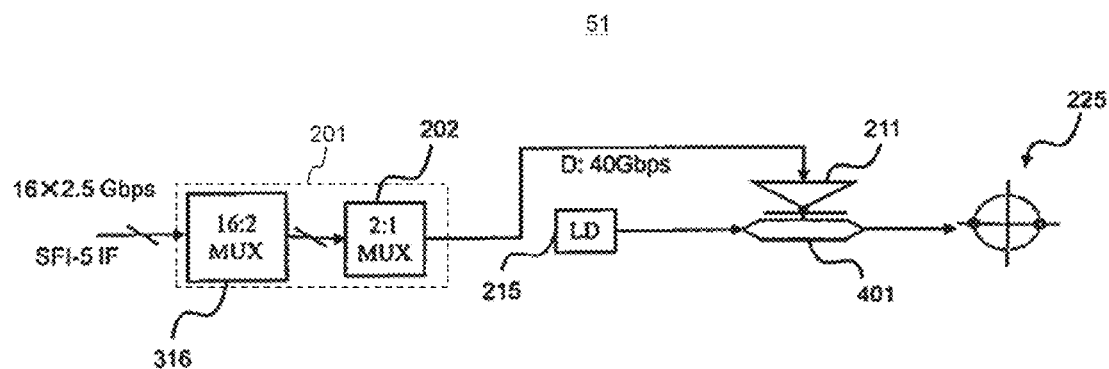
FIG. 1 is a block diagram explaining a transmitter for carrying out DPSK modulation.
Figure 2:
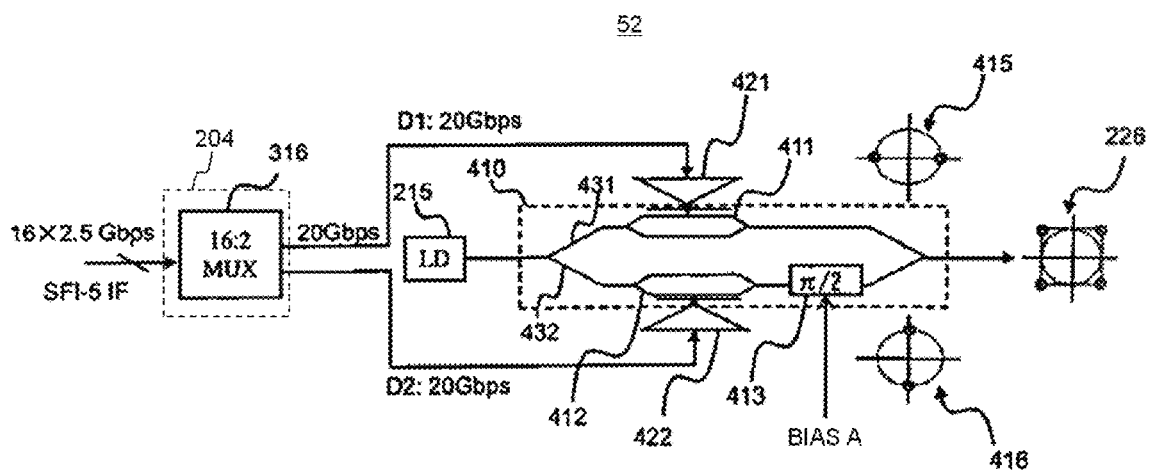
FIG. 2 is a block diagram explaining a transmitter for carrying out DQPSK modulation.

Embodiments of the invention will be explained referring to the attached drawings. The embodiments explained below are examples of the invention and the invention is not restricted by the embodiments. Note that it is assumed in the description and the drawings that the components having the same reference numerals are the same components each other.

A First Exemplary Embodiment

Figure 3:
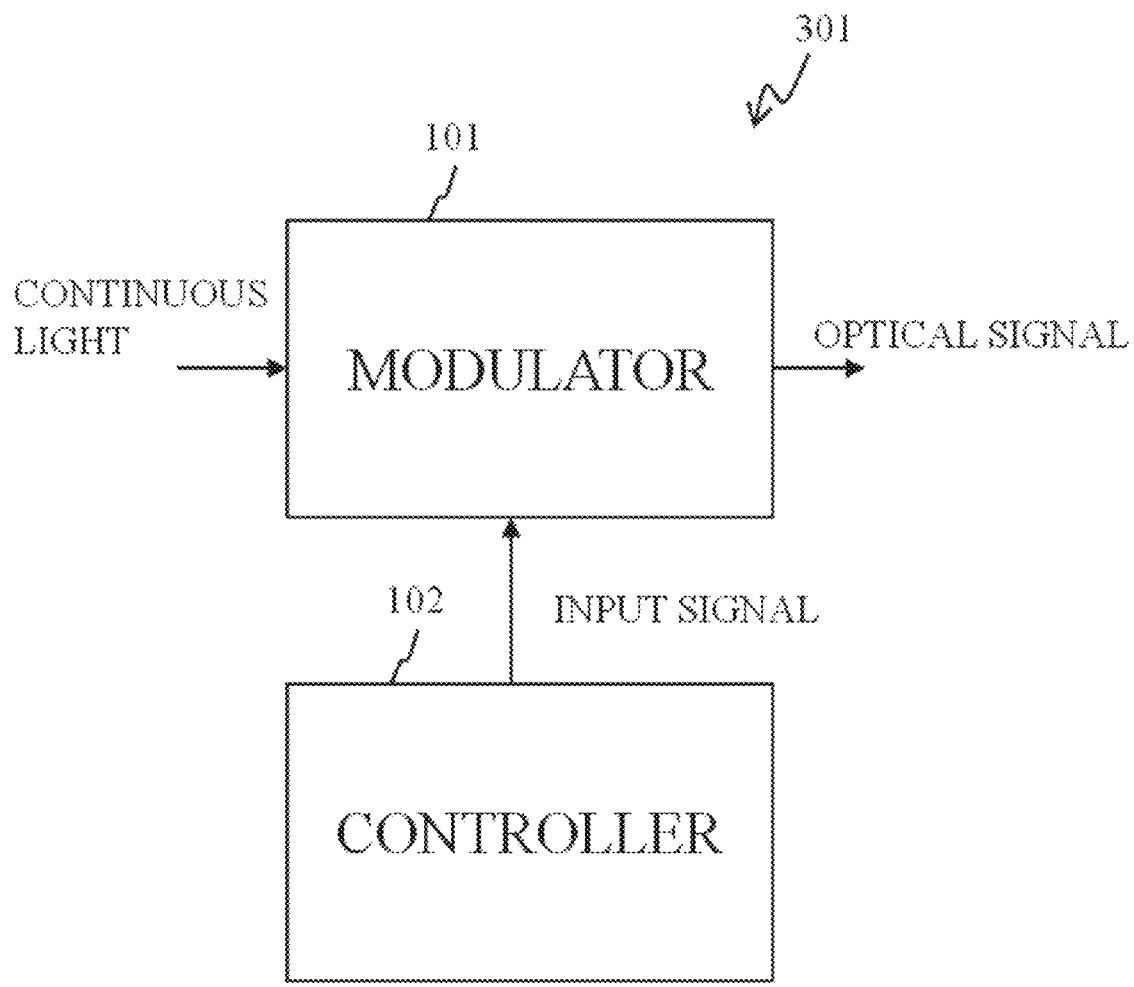
FIG. 3 is a view explaining an optical transmission apparatus according to the invention.

FIG. 3 is a view explaining an optical transmission apparatus 301 of the embodiment. The optical transmission apparatus 301 includes a modulator 101 and a controller 102. The modulator 101 is a modulator which can modulate the light from a light source by quadrapture phase-shift keying the light and can output the modulated light. The controller 102 controls the input signal to the modulator 101 and makes the modulator 101 operate a quadrapture phase-shift keying operation or a π/2 shift binary phase-shift keying operation.

Figure 4:
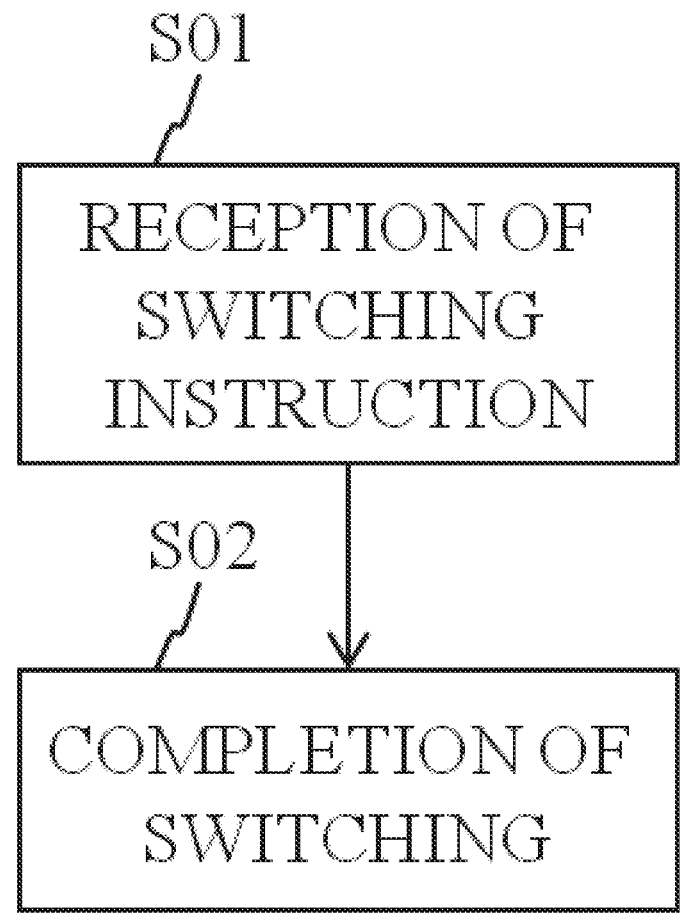
FIG. 4 is a view explaining an optical transmission method according to the invention.

The optical transmission apparatus 301 operates as shown in FIG. 4. That is, an optical transmission method of the optical transmission apparatus 301 sequentially carries out a switching instruction receiving procedure S01 and a switching completion procedure S02. The switching instruction receiving procedure S01 is a procedure for receiving an instruction for switching the modulation operations of the modulator 101 capable of quadrapture phase-shift keying the light from the light source and outputting the light. The switching completion procedure S02 is a procedure for controlling the input signal to the modulator 101 after the switching instruction receiving procedure S01 and causing the modulator 101 to carry out a quadrature phase-shift keying operation or a π/2 shift binary phase-shift keying operation.

For example, a computer can be operated as the controller 102 by being caused to carryout the following optical transmission program. The optical transmission program realizes a function for causing the controller 102 to control the input signal to the modulator 101, which can modulate the light from the light source by quadrapture phase-shift keying and output the modulated light to the modulator 101 to operate the quadrapture phase-shift keying modulation or the π/2 shift binary phase-shift keying modulation. Specifically, the computer can realize the optical transmission method by executing the optical transmission program.

Figure 5:
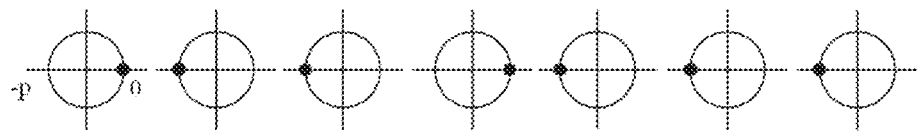
FIG. 5 is a view explaining BPSK and $\pi/2$ shift BPSK.
Figure 5:
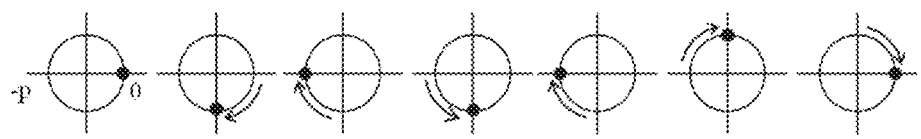

The π/2 shift binary phase-shift keying will be explained using a constellation map of FIG. 5. Hereinafter, the π/2 shift binary phase-shift keying may be also described as π/2 shift BPSK. As in FIG. 5(a), in BPSK, when the data of a modulation signal is "0", the phase of an optical signal is "0", whereas when the data of the modulation signal is "1", the phase of the optical signal is "−π". Thus, in the BPSK, the symbol phase difference between adjacent time slots is 0 or π.

In contrast, as in FIG. 5(b), in π/2 shift BPSK, when the data of a modulation signal is "0", the phase of the optical signal is advanced "π/2" (+π/2), whereas when the data of the modulation signal is "1", the phase of the optical signal is returned "π/2" (−π/2). Thus, in the π/2 shift BPSK, the symbol phase difference between adjacent time slots are π/2 at all times.

Figure 6:
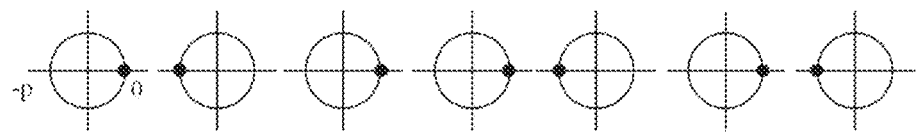
FIG. 6 is a view explaining DBPSK and $\pi/2$ shift DBPSK.
Figure 6:
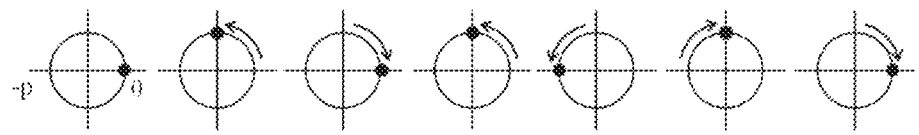

Note that this is the same even if the BPSK and the π/2 shift BPSK are differential phase-shift keying. Hereinafter, BPSK of differential phase-shift keying may be described as DPSK or DBPSK (Differential BPSK). The term π/2 shift DBPSK will be explained using a constellation map of FIG. 6.

As in FIG. 6(a), in the DBPSK, when the data of a modulation signal is "0", the phase of an optical signal is not changed (the same phase as that of an adjacent symbol), whereas when the data of the modulation signal is "1", the phase of the optical signal is advanced "π" (+π of the phase of the adjacent symbol). Thus, the symbol phase difference of the DBPSK is 0 or π.

In contrast, as in FIG. 6(b), in the π/2 shift DBPSK, when the data of a modulation signal is changed, the phase of an optical signal is advanced "π/2" (+π/2), whereas when the data of the modulation signal is not changed, the phase of the optical signal is returned "π/2" (−π/2). Thus, in the π/2 shift DBPSK, the symbol phase difference between the adjacent time slots is π/2 at all times.

Figure 7:
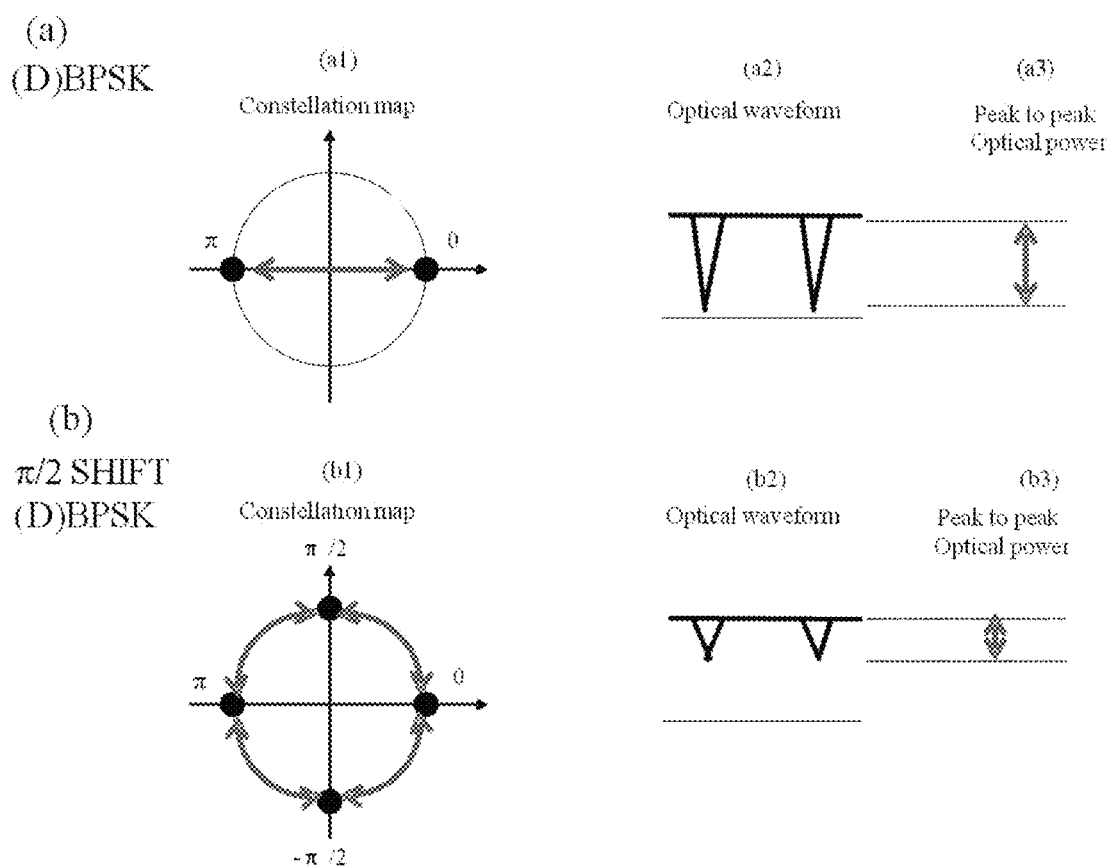
FIG. 7 is a view explaining an optical signal output by an optical transmission apparatus according to the invention.

As explained above, in the BPSK or the DBPSK, the symbol phase difference between the adjacent time slots is 0 or π, whereas, in the π/2 shift BPSK or the π/2 shift DBPSK, the symbol phase difference between the adjacent time slots is π/2 at all times. As shown in FIG. 7, the difference of the symbol phase differences also causes difference in the optical intensity of the optical signal output from the modulator 101. Note that the BPSK or the DBPSK may be described as (D)BPSK.

FIG. 7 is a view explaining the optical intensity of the optical signal output from the modulator 101. FIG. 7(a) explains the (D)BPSK, wherein (a1) shows a constellation map, (a2) shows the waveform of an output optical signal, and (a3) shows an optical intensity variation range. FIG. 7(b) explains the π/2 shift (D)BPSK. In FIG. 7(b), (b1) shows a constellation map, (b2) shows the waveform of an output optical signal, and (b3) shows an optical intensity variation range.

As in FIG. 7(a1), in the (D)BPSK, since a symbol becomes 0 or π and passes through an origin (an extinction state) on the way of a phase transition, the optical output power of a transmitter changes up to the light extinction state as in FIG. 7(a2). In contrast, as in FIG. 7(b1), in the π/2 shift (D)BPSK, a symbol becomes 0, π/2, π, and 3π/2 and does not pass through an origin (an extinction state) on the way of a phase transition. Thus, as in FIG. 7(b2), the optical output power of the transmitter does not reduce up to the light extinction state. Thus, as shown in FIGS. 7(a3) and (b3), the variation range of the optical output power of the π/2 shift (D) BPSK becomes small as compared with the variation range of the optical output power of the (D)BPSK.

As described above, since the optical output power of the π/2 shift (D)BPSK is varied less than that of the (D)BPSK, the π/2 shift (D)BPSK is less influenced by the influence of nonlinear effect and unlikely to receive a transmission distance restriction due to the nonlinear effect.

Further, as described above, although the band requested to a device such as a modulator and the like is widened in proportion to an increase of a bit rate, since the π/2 shift (D)BPSK does not pass through the origin (the extinction state) on the way of the phase transition, the frequency band of a modulation signal becomes equal to or less than a symbol rate. Thus, the band requested to a device that constitutes the π/2 shift (D)BPSK can be narrowed as compared with the (D)BPSK. That is, the π/2 shift (D)BPSK can be more easily realized as well as the cost is lower than the (D)BPSK.

Thus, the first exemplary embodiment can reduce the influence of the nonlinear effect of an optical fiber and suppress the band requested to the device from being widened.

Further, the first exemplary embodiment can easily switch modulation methods between the (D)QPSK and the π/2 shift (D)BPSK only by switching the input signals to the modulator 101.

Subsequently, switching of the modulation methods will be explained in more detail.

Figure 8:
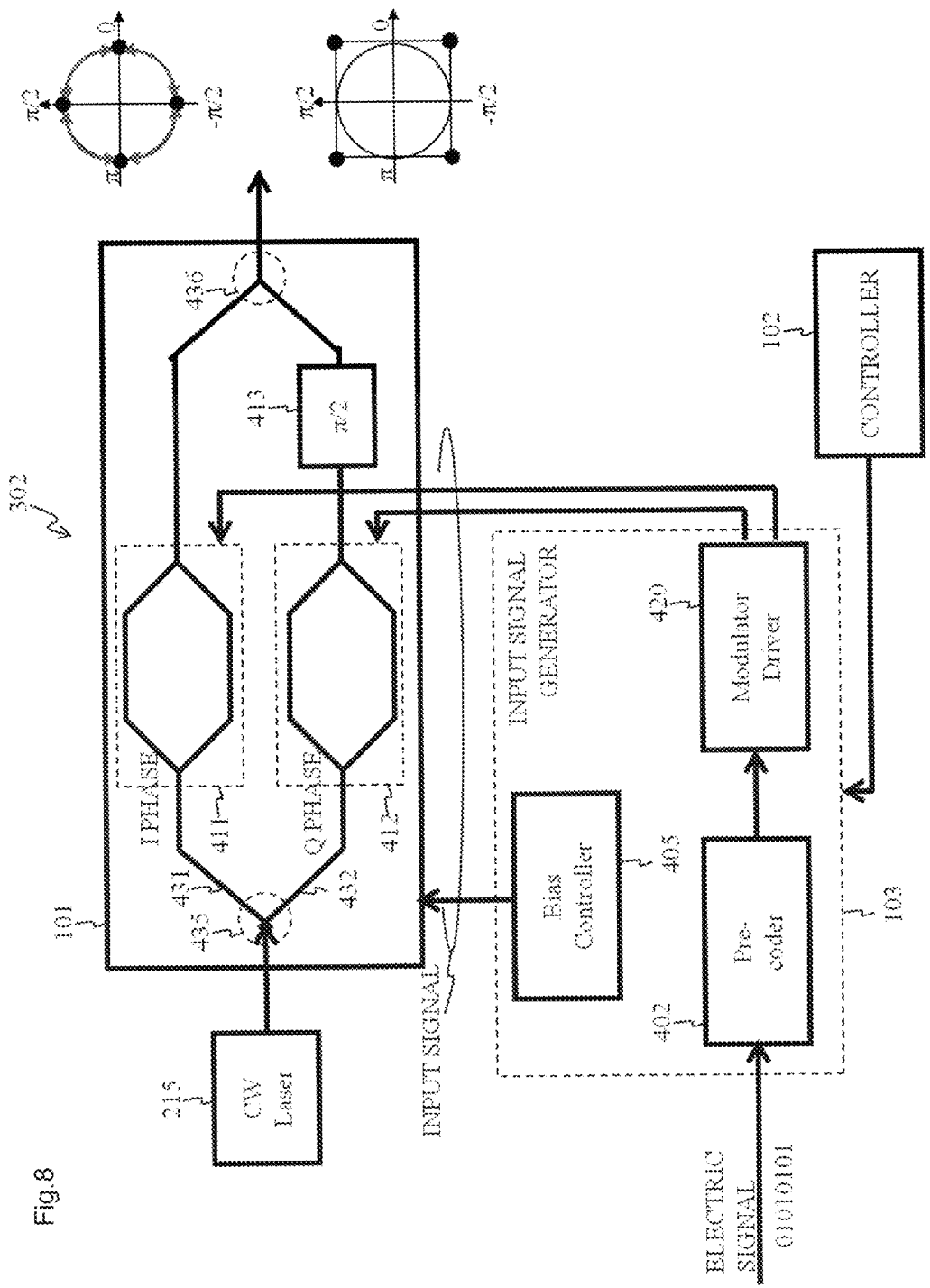
FIG. 8 is a view explaining an optical transmission apparatus according to the invention.

FIG. 8 is a view explaining the configuration of an optical transmission apparatus 302 of the first exemplary embodiment. The optical transmission apparatus 302 will explain the optical transmission apparatus 301 of FIG. 3 in more detail. The optical transmission apparatus 302 provides the modulator 101, the controller 102, an input signal generator 103, and a light source 215.

The light source 215 generates continuous light having the carrier frequency of the optical signal output by the optical transmission apparatus 302. The modulator 101 has two optical paths (431, 432) for branching the light from the light source 215 to two lights, modulating the two lights based on an input signal so that the two lights have a different phase from each other, and multiplexing the two lights. Further, the modulator 101 has an optical branch section 435, Mach-Zehnder type modulating sections (411, 412), a phase shift section 413, and an optical multiplexer 436.

The optical branch section 435 branches the light from the light source 215 to two lights and couples the two lights with the optical paths (431, 432). The Mach-Zehnder type modulating sections (411, 412) are provided to the respective optical paths (431, 432), and modulate the phase of the light from the light source 215 according to the input signal (modulation signal). The phase shift section 413 is provided to the optical path 432 on one hand and shifts the phase of the light. The optical multiplexer 436 multiplexes the lights from the optical paths (431, 432). The modulator 101 is, for example, an LN modulator. As other modulator, a modulator having an InP nin structure (refer to, for example, Non Patent Literature 1) may be used.

The input signal generator 103 has a precoder 402, a driver 420, and a bias controller 405. The precoder 402 carries out encoding processing of a digital electric signal (0/1) to be input. The driver 420 amplifies the signal output by the precoder 402 and outputs a modulation signal to the modulator 101. The bias controller 405 controls the bias voltage of the modulator 101. In detail, the bias controller 405 controls the operating points of the Mach-Zehnder type modulating sections (411, 412) by the bias voltage and controls the operation of the phase shift section 413 (whether or not a π/2 shift is carried out).

The controller 102 controls the operations of the driver 420 and the bias controller 405 using the modulation signal output by the driver 420 and the bias voltage output by the bias controller 405 as input signals. The controller 102 causes the modulator 101 to carry out a (D)QPSK operation or a π/2 shift (D)BPSK operation by switching input signals. The controller 102 causes the modulator 101 to carry out the (D)QPSK operation by controlling both the optical path 431 and the optical path 432 by the input signals. Specifically, the controller 102 issues an instruction of the (D)QPSK operation to the input signal generator 103. The precoder 402 carries out the encoding processing of the electric signal input in response to the instruction and generates a (D)QPSK coding signal. The driver 420 amplifies the (D)QPSK coding signal and makes it to modulation signals. The input signal generator 103 inputs the modulation signal to the Mach-Zehnder type modulating sections (411, 412) as the input signals and inputs a bias for subjecting the phase of light to the π/2 shift to the phase shift section 413 as the input signal.

Further, when the modulator 101 is caused to carry out the π/2 shift (D)BPSK operation, the controller 102 adjusts the input signals so that the operation is carried out in the optical path 432 of the modulator 101. Specifically, the controller 102 issues an instruction of the π/2 shift (D)BPSK operation to the input signal generator 103. The precoder 402 carries out the encoding processing of the electric signal that is input in response to the instruction and generates a π/2 shift (D)BPSK coding signal. The driver 420 amplifies the π/2 shift (D)BPSK coding signal and makes the signal to the modulation signal. The input signal generator 103 inputs the modulation signal to Mach-Zehnder type modulating section 412 as the input signals and inputs a bias for subjecting the phase of light to the π/2 shift to the phase shift section 413 as the input signals when necessary. In detail, the controller 102 can set the phase of light to "0" or "π" by the Mach-Zehnder type modulating section 412 and further create the phase of lights "0", "π/2", "π", and "3π/2" depending on whether or not the phase of the light is π/2 shifted by the phase shift section 413. At the time, it is necessary to prevent the light of the optical path 431 from being output. The controller 102 issues an instruction to the input signal generator 103 and causes it to generate the input signal which makes the transmittance rate of Mach-Zehnder type modulating section 411 to zero.

Figure 9:
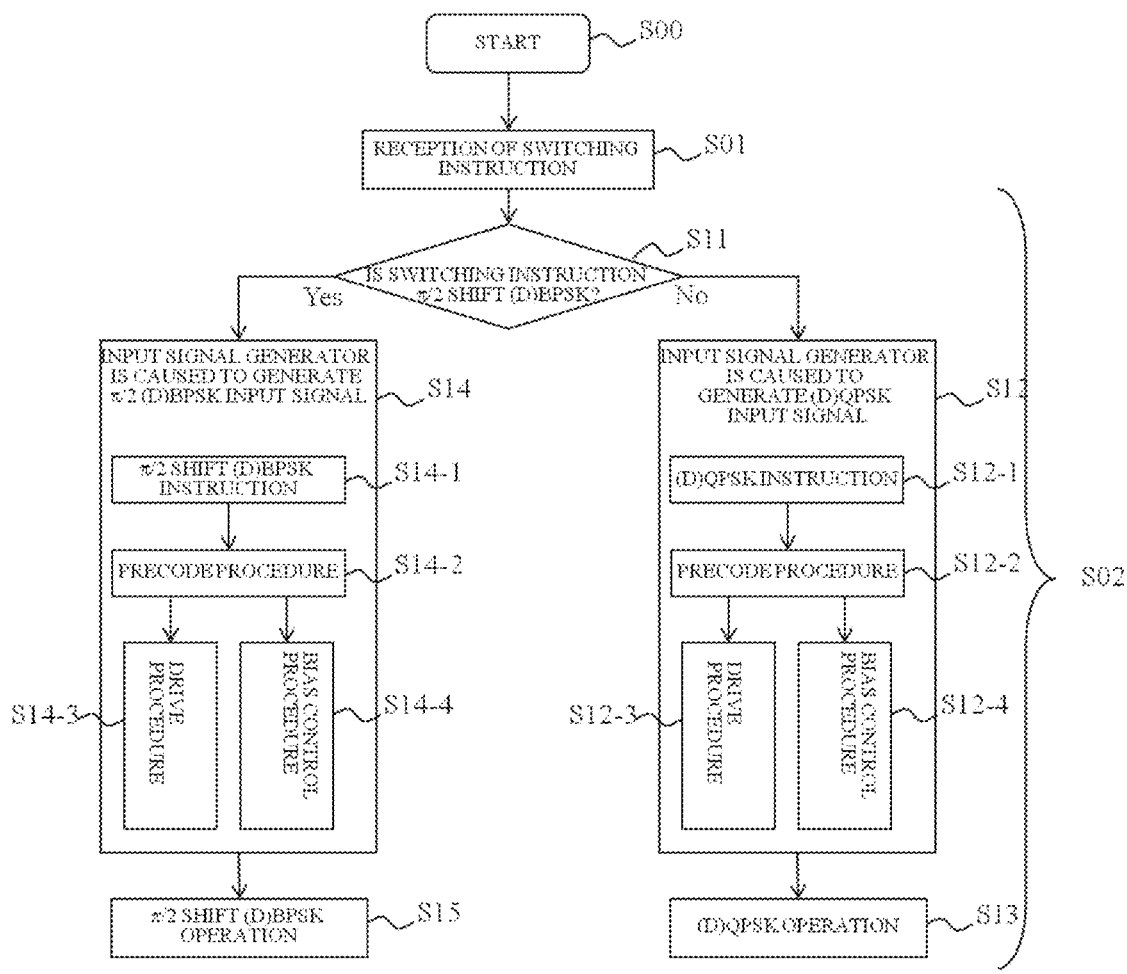
FIG. 9 is a view explaining an optical transmission method according to the invention.

FIG. 9 is a flowchart explaining the optical transmission method of the first exemplary embodiment. The controller 102 receives a switching instruction for switching the modulation methods at the switching instruction receiving procedure S01 (step S01). The controller 102 determines whether or not the switching instruction is a π/2 (D)BPSK (step S11). When the switching instruction is not the π/2 (D)BPSK, the controller 102 causes the input signal generator to generate a (D)QPSK input signal (step S12). At step S12, on receiving an instruction from the controller 102 (step S12-1), the precoder 402 carries out a precode procedure for carrying out the encoding processing (for (D)QPSK) of a digital electric signal to be input (step S12-2). Then, the driver 420 carries out a drive procedure for amplifying the signal output at the precode procedure and outputs a modulation signal to the modulator 101 (step S12-3). Further, the bias controller 405 carries out a bias control procedure for controlling the bias voltage of the modulator 101 (step S12-4). The modulator 101 carries out the (D)QPSK operation by the input signal (step S13).

In contrast, at step S11, when the switching instruction is the π/2 (D)BPSK, the controller 102 causes the input signal generator to generate an input signal for π/2 (D)BPSK (step S14). At step S14, on receiving an instruction from the controller 102 (step S14-1), the precoder 402 carries out a precode procedure for carrying out the encoding processing (for π/2 (D) BPSK) of a digital electric signal being input (step S14-2). The driver 420 carries out a drive procedure for amplifying the signal output at the precode procedure and outputting a modulation signal to the modulator 101 (step S14-3). Further, the bias controller 405 carries out a bias control procedure for controlling the bias voltage of the modulator 101 (step S14-4). The modulator 101 carries out a π/2 (D)BPSK operation by the input signal (step S15).

As described above, when the controller 102 receives an instruction for causing the modulator to carry out the π/2 shift binary phase-shift keying operation at the switching instruction receiving procedure S01, the controller 102 adjusts the input signal so that the operation is carried out on the optical path of the modulator on the one hand at the switching completion procedure S02. Thus, the optical transmission apparatuses (301, 302) of the first exemplary embodiment can cause the single (D)QPSK modulator 101 to carry out the (D)QPSK operation or the π/2 shift (D) BPSK operation in response to an instruction from the controller 102. Further, since it is sufficient only to change the input signals (the bias voltage and the modulation signal) directly input to the modulator 101, a modulator bias control circuit of the (D)QPSK can be applied, which makes the realization of the first exemplary embodiment easy.

Specifically, in the first exemplary embodiment, the modulator can be easily bias controlled and the plural modulation methods can be flexibly switched.

A Second Exemplary Embodiment

Figure 10:
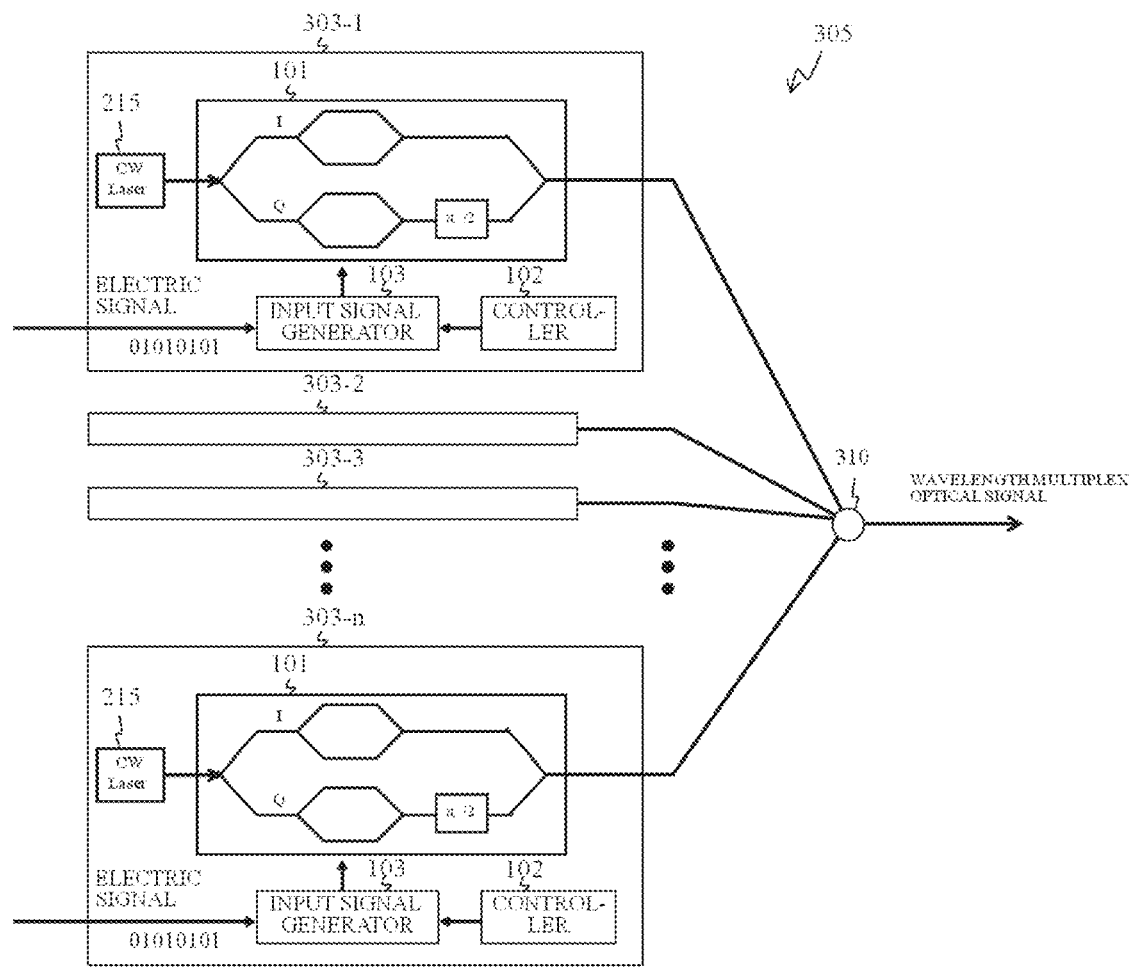
FIG. 10 is a view explaining an optical transmission apparatus according to the invention.

FIG. 10 is a view explaining an optical transmission apparatus 305 of a wavelength division multiplex communication (WDM). The optical transmission apparatus 305 includes n sets (n is an integer equal to or more than 2) of optical transmission apparatuses 303 corresponding to the optical transmission apparatuses (301, 302) explained in the first exemplary embodiment and a wavelength multiplexer 310 for multiplexing the optical signals output by respective modulators 101 of the optical transmission apparatuses 303. Light sources 215 of the optical transmission apparatuses 303 are set to a different wavelength from each other. Thus, the optical signals multiplexed by the wavelength multiplexer 310 become a wavelength multiplex optical signal. The wavelength multiplex optical signal is transmitted through an optical transmission path and received by a not shown optical receiver.

Figure 11:
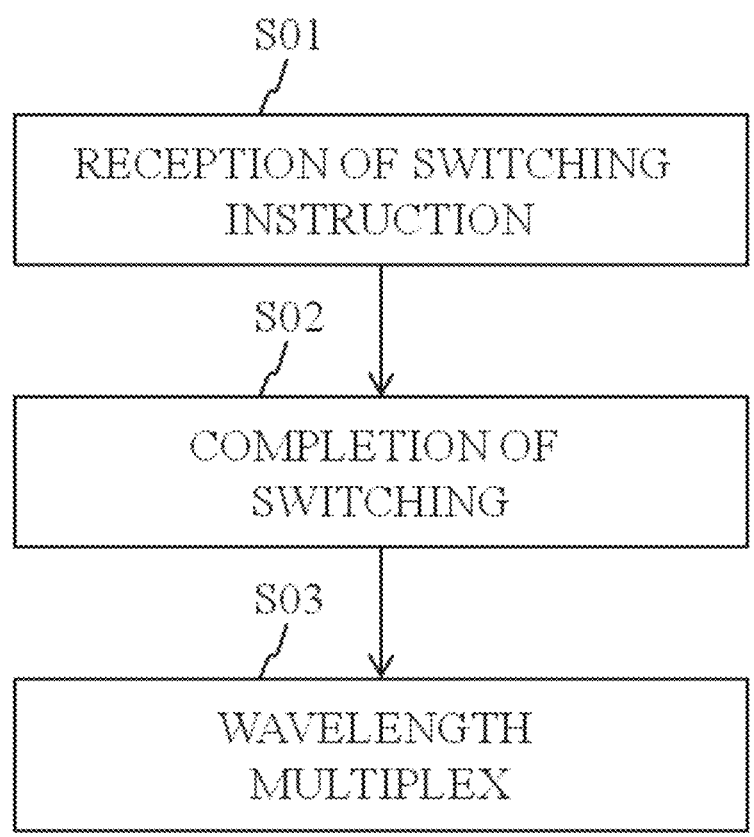
FIG. 11 is a view explaining an optical transmission method according to the invention.

FIG. 11 is a view explaining an optical transmission method of the second exemplary embodiment. The optical transmission apparatus 305 of the second exemplary embodiment carries out a wavelength multiplexing procedure S03 in addition to the optical transmission methods explained in the first exemplary embodiment. The optical transmission method of the second exemplary embodiment may carry out the wavelength multiplexing procedure S03 by that the respective modulators 303 carry out the operations explained in the first exemplary embodiment (the switching instruction receiving procedure S01 and the switching completion procedure S02). Further, the optical transmission method of the first exemplary embodiment may carry out the wavelength multiplexing procedure S03 by carrying out an operation for putting the modulation methods of all the modulators 101 in order (the switching instruction receiving procedure S01 and the switching completion procedure S02).

A WDM transmission system employing the (D)BPSK has a problem that since receiving characteristics are degraded by the influence of the nonlinear effect of the XPM, SPM, and the like of an optical fiber, a transmission distance is restricted. However, since the optical transmission apparatus 305 of the second exemplary embodiment is provided with the optical transmission apparatuses (301, 302) explained in the first exemplary embodiment, an optical output power at the time of $\pi/2$ shift BPSK is less varied, which reduces the influence of the nonlinear effect. Thus, the WDM provided with the optical transmission apparatus 305 of the second exemplary embodiment is unlikely to receive the transmission distance restriction due to the nonlinear effect so that a long distance transmission becomes possible.

Effects of Invention

An exemplary advantage according to the invention, there can be provided the optical transmission apparatus, the optical transmission method, and the optical transmission program capable of reducing the influence of the nonlinear effect of the optical fiber, suppressing the band requested to the device from being widened, easily bias controlling the modulator, and flexibly switching the plural modulation methods.

Program

A controller 102 is a computer and can realize the optical transmission methods explained in the first exemplary embodiment and 2 by carrying out the programs of Supplementary notes 12-16 described below.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The whole or part of the exemplary embodiments disclosed above can be described as, but not limited to, the following supplementary notes.

(Supplementary Note 1)

An optical transmission apparatus comprising:

a modulator which can modulate the light from a light a source of quadrapture phase-shift keying and can output the modulated light; and a controller which controls an input signal to the modulator and make the modulator operate a quadrapture phase-shift keying modulation or a $\pi/2$ shift binary phase-shift keying modulation.

(Supplementary Note 2)

The optical transmission apparatus according to supplementary note 1, wherein the modulator comprises two optical paths for branching the light from the light source to two lights, modulating the two lights based on the input signal so that the lights have a different phase from each other, and multiplexing the two lights, respectively, and when the modulator is caused to carry out the $\pi/2$ shift binary phase-shift keying operation, the controller adjusts the input signal so that the operation is carried out on one of the optical paths of the modulator.

(Supplementary Note 3)

The optical transmission apparatus according to supplementary note 1 or 2 further comprising:

a precoder for carrying out encoding processing of a digital electric signal to be input;

a driver for amplifying a signal output by the precoder and outputting a modulation signal to the modulator; and a bias controller for controlling a bias voltage of the modulator, wherein the controller controls the driver and the bias controller using the modulation signal output by the driver and the bias voltage output by the bias controller as the input signals and causes the modulator to carry out the quadrapture phase-shift keying operation or the $\pi/2$ shift binary phase-shift keying operation.

(Supplementary Note 4)

The optical transmission apparatus according to any of supplementary notes 1 to 3, wherein the modulator comprises an optical branch section for branching the light from the light source to two lights and coupling the two lights with the optical paths, Mach-Zehnder type modulating sections provided to the optical paths, respectively, a phase shift section provided to one of the optical paths for shifting the phase of light, and an optical multiplexer for multiplexing the lights from the optical paths.

(Supplementary Note 5)

The optical transmission apparatus according to any of supplementary notes 1 to 4, wherein the quadrapture phase-shift keying operation or a $\pi/2$ shift binary phase-shift keying operation of the modulator is differential phase-shift keying.

(Supplementary Note 6)

The optical transmission apparatus according to any of supplementary notes 1 to 5 further comprises a wavelength multiplexer for wavelength multiplexing the outputs from the plurality of modulators to which the lights with a different wavelength from a plurality of light sources are input, respectively.

(Supplementary Note 7)

An optical transmission method comprising:

a switching instruction receiving procedure for receiving an instruction for switching the modulation operations of a modulator which is able to modulate of the light from the light source by quadrapture phase-shift keying and can output the modulated light; and a switch completion procedure for controlling the input signal to the modulator after the switching instruction receiving procedure and makes the modulator operate the quadrapture phase-shift keying modulation or the π/2 shift binary phase-shift keying modulation.

(Supplementary Note 8)

The optical transmission method according to supplementary note 7, wherein the modulator comprises two optical paths for branching the light from the light source to two lights, modulating the two lights based on the input signal so that they have a different phase from each other, and multiplexing the two lights, and when an instruction for causing the modulator to modulate the π/2 shift binary phase-shift keying operation at the switching instruction receiving procedure, the input signal is adjusted so that the operation is carried out on one of the optical paths of the modulator at the switch completion procedure.

(Supplementary Note 9)

The optical transmission method according to supplementary note 7 or 8, further carrying out:

a precode procedure for carrying out encoding processing of a digital electric signal to be input;

a drive procedure for amplifying the signal output at the precode procedure and outputting a modulation signal to the modulator; and a bias control procedure for controlling the bias voltage of the modulator, wherein the modulator is caused to carry out the modulation of quadrapture phase-shift keying operation or the π/2 shift binary phase-shift keying operation using the modulation signal output at the drive procedure and the bias voltage output at the bias control procedure as the input signals.

(Supplementary Note 10)

The optical transmission method according to any of supplementary notes 7 to 9, wherein the modulation of the quadrapture phase-shift keying operation or a π/2 shift binary phase-shift keying operation of the modulator is differential phase-shift keying.

(Supplementary Note 11)

The optical transmission method according to any of supplementary notes 7 to 10 further carries out a wavelength multiplex procedure for wavelength multiplexing the outputs from the plurality of modulators to which the lights with a different wavelength from a plurality of light sources are input, respectively.

(Supplementary Note 12)

An optical transmission program for realizing a function for a controller which controls the inputting signal to the modulator which modulates the light from a light source by the quadrapture phase-shift keying modulation; and a function make the modulator operate a quadrapture phase-shift keying modulation or a π/2 shift binary phase-shift keying modulation.

(Supplementary Note 13)

The optical transmission program according to supplementary note 12, wherein the modulator comprises two optical paths for branching the light from the light source to two lights, modulating the two lights based on the input signal so that the two lights have a different phase from each other, and multiplexing the two lights, respectively, and when the modulator is caused to carry out a π/2 shift binary phase-shift keying operation, the controller adjusts the input signal so that the operation is carried out on one of the optical paths of the modulator.

(Supplementary Note 14)

The optical transmission program according to supplementary note 12 or 13, wherein a precoder carries out encoding processing of a digital electric signal to be input, a driver amplifies the signal output by the precoder and outputs a modulation signal to the modulator, and a bias controller controls the bias voltage of the modulator, wherein, the controller is caused to control the driver and the bias controller using the modulation signal output by the driver and the bias voltage output by the bias controller as the input signal and the modulator is caused to carry out a quadrapture phase-shift keying operation or a π/2 shift binary phase-shift keying operation.

(Supplementary Note 15)

The optical transmission program according to any of supplementary notes 12 to 14, wherein the quadrapture phase-shift keying operation or a π/2 shift binary phase-shift keying operation of the modulator is differential phase-shift keying.

(Supplementary Note 16)

The optical transmission program according to any of supplementary notes 12 to 15, wherein the program wavelength multiplexes the outputs of the plurality of modulators to which the lights with a different wavelength from a plurality of light sources are input, respectively.

REFERENCE SIGNS LIST

51, 52: transmitter
101: modulator
102: controller
103: input signal generator
201, 204: precoder
211: driver
215: light source
225, 226: constellation map
301, 302, 303, 305: optical transmission apparatus
310: wavelength multiplexer
401: modulator
402: precoder
405: bias controller
410: modulator
411, 412: Mach-Zehnder type modulator
413: phase shift section
415, 416: constellation map
435: optical branch section
436: optical multiplexer
420: driver
431, 432: optical path

What is claimed is:

1. An optical transmission apparatus comprising:
a modulator which modulates a light from a light source by a quadrature phase-shift keying operation or a π/2 shift binary phase-shift keying operation;
a driver for generating a modulation signal which causes the modulator to carry out the quadrature phase-shift keying operation or the π/2 shift binary phase-shift keying operation;
a bias controller for controlling a bias voltage of the modulator; and
a controller which switches between the modulation operations of the quadrature phase-shift keying modulation and the π/2 shift binary phase-shift keying modulation,
wherein
the modulator comprises two optical paths for branching the light from the light source to two lights, modulating the two lights based on the input signal so that the lights have a different phase from each other, and multiplexing the two lights, respectively, when the modulator is caused to carry out the quadrature phase-shift keying operation, the controller adjusts the driver so as to generate the modulation signal which causes the modulator to carry out the quadrature phase-shift keying operation, and adjusts the bias controller so that the operation is carried out on both of the optical paths of the modulator, and when the modulator is caused to carry out the $\pi/2$ shift binary phase-shift keying operation, the controller adjusts the driver so as to generate the modulation signal which causes the modulator to carry out the $\pi/2$ shift binary phase-shift keying operation, and adjusts the bias controller so that the operation is carried out on one of the optical paths of the modulator.

2. The optical transmission apparatus according to claim 1 further comprising:

a precoder for carrying out encoding processing of a digital electric signal to be input, wherein the driver amplifies a signal output by the precoder and outputs the modulation signal to the modulator.

3. An optical transmission method comprising:

a switching instruction receiving procedure for receiving an instruction for switching between the modulation operations of a modulator which modulates a light from a light source by a quadrature phase-shift keying operation or a $\pi/2$ shift binary phase-shift keying operation;

a drive procedure for generating a modulation signal which causes the modulator to carry out the quadrature phase-shift keying operation or the $\pi/2$ shift binary phase-shift keying operation;

a bias control procedure for controlling a bias voltage of the modulator; and a switch completion procedure for switching between the modulation operations of the quadrature phase-shift keying modulation and the $\pi/2$ shift binary phase-shift keying modulation, wherein the modulator comprises two optical paths for branching the light from the light source to two lights, modulating the two lights based on the input signal so that they have a different phase from each other, and multiplexing the two lights, respectively, when an instruction for causing the modulator to carry out the quadrature phase-shift keying operation is received at the switching instruction receiving procedure, the switch completion procedure adjusts the drive procedure so as to generate the modulation signal which causes the modulator to carry out the quadrature phase-shift keying operation, and adjusts the bias control procedure so that the operation is carried out on both of the optical paths of the modulator, and when an instruction for causing the modulator to carry out the $\pi/2$ shift binary phase-shift keying operation is received at the switching instruction receiving procedure, the switch completion procedure adjusts the drive procedure so as to generate the modulation signal which causes the modulator to carry out the $\pi/2$ shift binary phase-shift keying operation, and adjusts the bias control procedure so that the operation is carried out on one of the optical paths of the modulator.

4. The optical transmission method according to claim 3, further carrying out:

a precode procedure for carrying out encoding processing of a digital electric signal to be input, wherein the drive procedure amplifies a signal output at the precode procedure and outputs the modulation signal to the modulator.

5. A non-transitory computer readable medium having recorded thereon an optical transmission program which, when executed by a computer, realizes:

a modulator function to make a modulator modulate a light from a light source by a quadrature phase-shift keying operation or a $\pi/2$ shift binary phase-shift keying operation;

a driver function to make a driver generate a modulation signal which causes the modulator to carry out the quadrature phase-shift keying operation or the $\pi/2$ shift binary phase-shift keying operation;

a bias function to make a bias controller control a bias voltage of the modulator; and a controller function to make a controller switch between the modulation operations of the quadrature phase-shift keying modulation and the $\pi/2$ shift binary phase-shift keying modulation, wherein the modulator comprises two optical paths for branching the light from the light source to two lights, modulating the two lights based on the input signal so that the two lights have a different phase from each other, and multiplexing the two lights, respectively, when the modulator is caused to carry out the quadrature phase-shift keying operation, the controller function adjusts the driver function so as to make the driver generate the modulation signal which causes the modulator to carry out the quadrature phase-shift keying operation, and adjusts the bias function so that the operation is carried out on both of the optical paths of the modulator, and when the modulator is caused to carry out the $\pi/2$ shift binary phase-shift keying operation, the controller function adjusts the driver function so as to make the driver generate the modulation signal which causes the modulator to carry out the $\pi/2$ shift binary phase-shift keying operation, and adjusts the bias function so that the operation is carried out on one of the optical paths of the modulator.

6. The non-transitory computer readable medium according to claim 5, wherein a precoder carries out encoding processing of a digital electric signal to be input, and the driver amplifies a signal output by the precoder and outputs the modulation signal to the modulator.

* * * * *